United States Patent [19]

Cook

[11] 4,014,132
[45] Mar. 29, 1977

[54] METHOD AND APPARATUS FOR HORTICULTURAL GRAFTING

[76] Inventor: Edward J. Cook, 12 Patton Drive, South Hamilton, Mass. 01982

[22] Filed: Jan. 29, 1976

[21] Appl. No.: 653,465

[52] U.S. Cl. .................................... 47/6; 30/303; 47/58; 81/9.5 R; 83/5; 144/193 J; 144/323
[51] Int. Cl.² ........................................ A01G 1/06
[58] Field of Search ............... 47/6, 1, 58; 30/303, 30/302, 301, 307, 347; 144/28, 193 R, 193 J, 216, 323; 83/5; 81/9.5 R, 9.5 L

[56] References Cited

UNITED STATES PATENTS

| | | | |
|---|---|---|---|
| 340,699 | 4/1886 | Congar | 47/6 |
| 2,219,654 | 10/1940 | La Fata | 47/6 |
| 2,368,420 | 1/1945 | Masunaga | 47/6 |
| 2,371,454 | 3/1945 | Lovisone | 47/6 |
| 2,431,602 | 11/1947 | Zeun | 83/5 X |
| 2,468,122 | 4/1949 | Shepard | 81/9.5 R X |
| 3,005,260 | 10/1961 | Muse | 30/302 |
| 3,595,285 | 7/1971 | Ruben | 144/28.5 |
| 3,680,255 | 8/1972 | Grigorov et al. | 47/6 |
| 3,810,308 | 5/1974 | Stubbmann | 30/302 X |
| 3,969,843 | 7/1976 | Wahler et al. | 47/6 |

FOREIGN PATENTS OR APPLICATIONS

| | | | |
|---|---|---|---|
| 58,881 | 12/1912 | Austria | 47/6 |
| 735,712 | 6/1966 | Canada | 81/9.5 |
| 47,238 | 2/1937 | France | 30/301 |
| 15,280 | 6/1967 | Japan | 144/193 R |
| 1,247,967 | 9/1971 | United Kingdom | 81/9.5 |
| 207,542 | 12/1967 | U.S.S.R. | 47/6 |

*Primary Examiner*—Edgar S. Burr
*Assistant Examiner*—James R. Feyrer
*Attorney, Agent, or Firm*—Morse, Altman, Oates & Bello

[57] ABSTRACT

A method and apparatus are disclosed for making improved grafting joints between plant components, particularly woody plants. Selected plant materials may be grafted one upon another by cutting out two diametrically opposed longitudinal 90° sectors from each end of the plant parts to be joined. The sectors are of equal length on each plant part and are joined by slipping the sectored end of one plant part into the cooperating sectored end of the other plant part so that the parts interlock. The joint is then enveloped by tape or the like to seal the joint.

Tools for making uniform, repeatable grafting cuts are disclosed, including a simple gauge block with an integral cutter. The tool includes a socket bisected by a blade for making a cut of uniform depth lengthwise down the center of the plant and at least one gauging groove having a transverse cutting edge to make the transverse cut to remove the sector from the slit plant. Hand tools and semi-automatic machinery are also disclosed for sectoring plants in a single operation and include radial cutting discs arranged perpendicularly to one another and adapted to make four simultaneous 90° slits lengthwise along the plant and reciprocating perpendicular cutting elements to remove the opposing slit sectors.

11 Claims, 13 Drawing Figures

U.S. Patent  Mar. 29, 1977  4,014,132
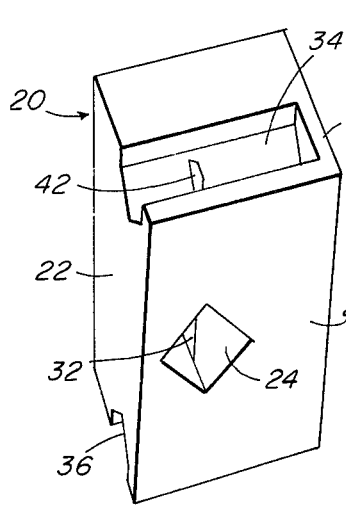
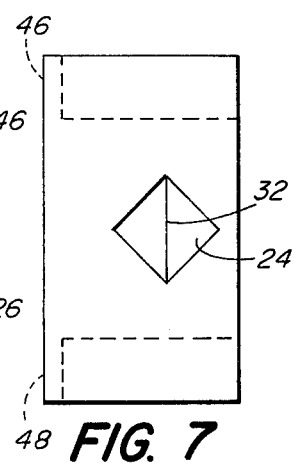
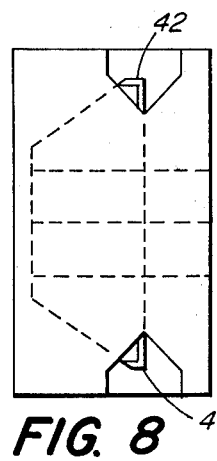
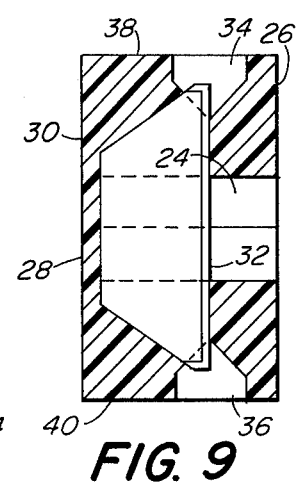
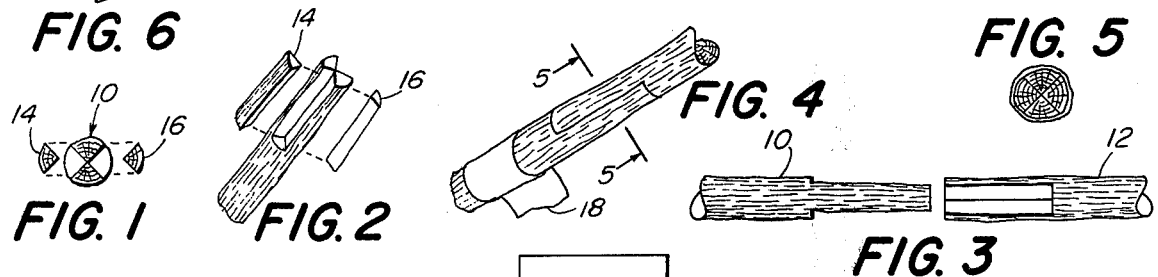
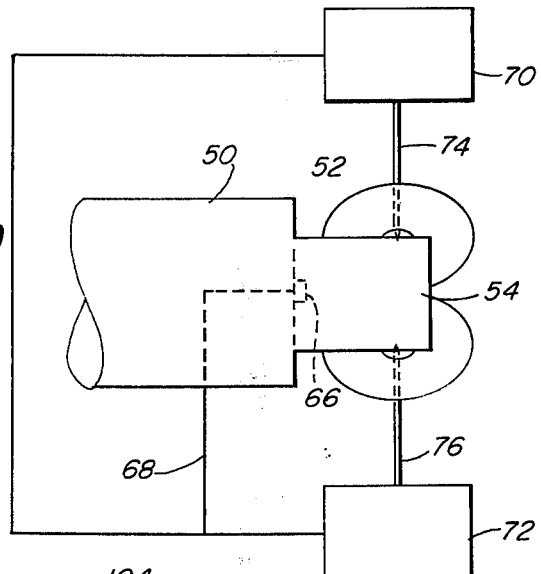
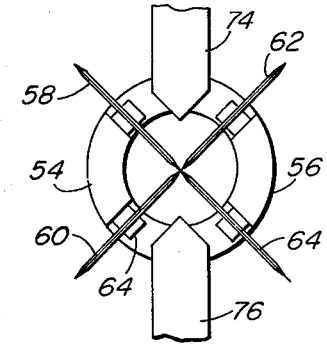
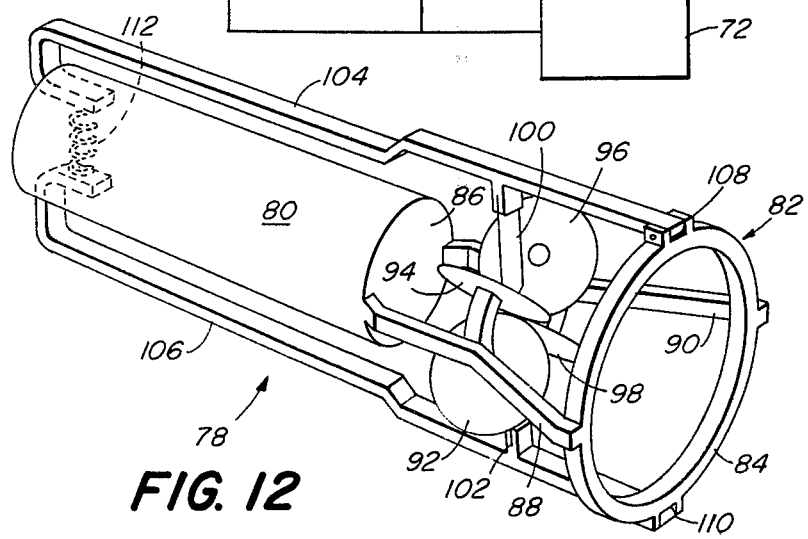
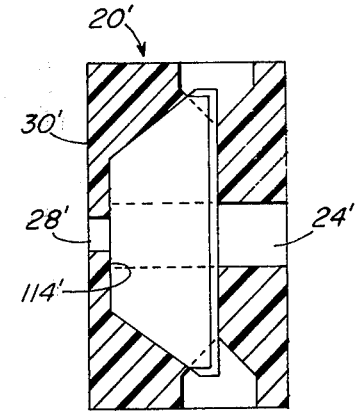

METHOD AND APPARATUS FOR HORTICULTURAL GRAFTING

BACKGROUND OF THE INVENTION

1. Field of the Invention

This invention relates generally to horticultural grafting and is more particularly directed toward a new and improved method and apparatus for making improved graft joints between plant parts, particularly woody plants.

2. Description of the Prior Art

The grafting of a scion upon a rootstock is a common horticultural practice used in the propagation of woody plants. The technique is used widely in the propagation of fruit tree varieties, since bench grafting may be performed during the dormant season of the plant as opposed to field budding during the growing season. Grafting provides the opportunity to build not only the conventional rootstock/scion tree, but also allows for a more complex interstem tree which may have as many as four selected plant materials grafted in series, one upon the other.

In order to graft successfully one plant component to another, it is necessary that the cambium layers of the joined components be in direct contact with one another and that the union be physically strong. The most common technique for grafting woody plant components is by way of a whip graft in which the end of each plant component is cut diagonally at approximately the same angle with a counterslit made medially and lengthwise through the diagonal cut to form a tongue. The components are then joined so that the tongues are interlocked and the joint is then wrapped by twine or the like. While the whip graft is relatively simple in principle, it requires considerable skill in preparation in order to insure good cambium contact. Further, the strength of the union parallel to the tongue slit is not consistently good and such grafts normally must be tightly wrapped to provide stability.

Accordingly, it is an object of the present invention to provide improvements in grafting techniques. Another object of the invention is to provide a grafting method adapted to produce a structurally strong grafting joint characterized by good cambium contact. A further object of this invention is to provide apparatus to carry out the improved grafting methods on a uniform, highly-repeatable basis.

SUMMARY OF THE INVENTION

This invention features the method of grafting a plant component to another plant component of substantially corresponding diameter, comprising the steps of removing a pair of longitudinal, diametrically opposed, 90° sectors from the end of each part to be joined, joining the sectored ends and then wrapping the ends.

Apparatus for cutting out the sectors for the grafting operation includes a combination cutting tool and gauge block formed with a socket bisected by a cutting element by means of which a plant end may be inserted in the socket against the cutter up against the back wall of the socket to form a longitudinal, diametrical slit, first at one angle and then a second slit at a 90° angle thereto. The branch end is then removed and laid in a groove formed in one wall of the block and having a cutting edge extending into the groove to sever opposing slit sectors from the branch. In another embodiment of the invention four radially arrayed cutting wheels are positioned at 90° angles and have their cutting edges joining a common point whereby a branch stem pressed between the wheels will be slit longitudinally in one stroke. Reciprocating trimming blades are then brought to bear at opposite sides of the branch to trim away the opposing sectors.

BRIEF DESCRIPTION OF THE DRAWINGS

FIG. 1 is an end view of a woody plant section that has been prepared according to the invention, FIG. 2 is a view in perspective thereof, FIG. 3 is a view in side elevation showing opposing ends of plant sections, sectored and ready for joining, FIG. 4 is a view in perspective of plant components that have been grafted according to the invention, FIG. 5 is a cross-sectional view taken along the line 5—5 of FIG. 4, FIG. 6 is a view in perspective of a combination gauge block and cutting tool for use in performing the grafting operation of this invention, FIG. 7 is a view in front elevation of the FIG. 6 tool, FIG. 8 is a view in side elevation thereof, FIG. 9 is a sectional view in side elevation thereof, FIG. 10 is a view in side elevation, somewhat schematic, of a machine for automatically slitting and severing sectored portions from a branch fed therein, FIG. 11 is a view in front elevation thereof, FIG. 12 is a view in perspective of a hand tool embodiment of the FIG. 10 and 11 apparatus, and FIG. 13 is a view similar to FIG. 9 showing a modification of the principal embodiment.

DETAILED DESCRIPTION OF THE PREFERRED EMBODIMENTS

Referring now to the drawings and to FIGS. 1 through 5 in particular, there are illustrated the steps of preparing and grafting one plant component to another according to the invention. For purposes of discussion, the process will be described in connection with the grafting of a scion 10 to a rootstock 12 for a woody plant such as a fruit tree or the like, although obviously the technique is applicable to other grafting situations. Initially a scion 10 is trimmed evenly at one end which is to be grafted to the opposing end of the rootstock 12, which is similarly prepared. Since the operations carried on in preparing the rootstock are identical to the preparations carried on in connection with the scion, only one procedure will be described. As shown in FIGS. 1 and 2, the scion 10, after the end has been trimmed straight across at a right angle, a pair of mutually perpendicular longitudinal slits are made along the trimmed end to form four equal longitudinal sectors. A pair of diametrically opposite sectors 14 and 16 are then severed at their respective bases and removed from the end of the scion. These sectors are of equal length and have a length which should be sufficient to form a good cambium contact and structural strength with the similarly prepared end of the rootstock 12. For small trees having a diameter of perhaps ¼ inch, for example, a sector length on the order of ¾ inch has proven to produce satisfactory results. For larger diameter specimens, the sectors may be made longer. In practice, the sectors may be removed by forming longitudinal diametrical slits along the centerline of the scion, each slit being made at a 90° angle with respect to the other. Once the two slits have been made, a cut is made at the end of the slit approximately ¾ inch back from the trimmed end of the scion, one cut at each side.

The cut is made radially inward and is pie-shaped in order to remove only the segment without cutting into the remaining portion of the plant. This operation is repeated on the rootstock 12 so that both ends are formed with similar sectored cuts allowing the two sections to be joined together in end-to-end interlocking relation as shown in FIGS. 3 and 4.

In practice, the scion and the root stock 12 should be of substantially equal diameter to insure proper fit and proper grafting results. Once the ends are joined together they should be bound in order to seal the joint and to add to the structural stability of the plant until such time as the two parts have grown together. In practice, satisfactory results have been achieved using a pressure sensitive adhesive tape 18, preferably a black plastic tape, which yields a strong joint in all directions, but is not subject to the girdling which can result from the use of a hard cord wrap, such as is commonly used in whip grafting operations. The tape is wrapped helically about the joint, fully enclosing it in the manner suggested in FIG. 4. In lieu of the use of pressure sensitive adhesive tape, the joint may also be secured by means of heat-shrinkable plastic tubing slipped over the joint and selected in a size that the tubing initially will be larger than the diameter of the plant sections and will, under the application of heat, shrink onto the joined sections to form a tight sealed joint.

Referring now to FIGS. 6 through 9, there is illustrated a simple, inexpensive combination gauge block and cutting tool for use in performing the grafting operations of FIGS. 1 through 5. The tool is generally indicated by the reference character 20, and in the illustrated embodiment is in the form of a block 22 small enough to be held in the hand and, by way of example, may have a height of perhaps 2-¼ inch and a width and thickness each of perhaps 1-¼ inch. Obviously, these dimensions are only by way of example and may be altered according to the average diameter of the plants involved. The block 22 may be made of a variety of material, such as metal, plastic or the like, and may be made by various techniques such as injection molding, casting, machining or the like. In any event, the block 22, which may be of one-piece construction or may be assembled from different parts, includes a socket 24 formed perpendicularly through the block, originating at a block face 26 and terminating at a window 28 in an opposite face 30 of the block 22. If the block is to be of one-piece construction, preferably it is made of a clear plastic material which allows the worker to view the end of a branch or rootstock which is inserted in the socket 24 for reasons that will presently appear. If the block is to be assembled from several different components then the wall defining the face 30 at least should be of a clear transparent material, such as acrylic plastic or the like. In any event, the window 28 is located at the inner end of the socket 24 and preferably the socket 24 should be a tilted square in cross-section. Although the particular shape is not critical, the V-groove formed in the socket aids in centering a branch in the socket.

Mounted within the block 22 and extending diagonally and vertically across the socket 24 is a slitter 32 in the form of a thin cutting blade whose leading cutting edge faces the open end of the socket 24 but is recessed from the face 26. The rear edge of the slitter 32 bears against the window 28 at the rear of the socket while triangular ends 42 and 44 of the slitter project upwardly and downwardly, respectively, into channels 34 and 36 formed respectively in the top and bottom faces 38 and 40 of the block 22. Typically, the depth of the slitter is on the order of ¾ inch with a length of perhaps 2 inches along its leading cutting edge. The socket 24 typically has a maximum width of perhaps ¾ inch at its widest point.

The channels 34 and 36 are arranged parallel to one another and perpendicular to the length of the socket 24 so that the angular corners 42 and 44 of the slitter 32 will be oriented transversely to the length of the channels. Each channel is open at one end and closed by means of a wall 46 and 48 at the other end. These walls form a part of a face of the block and serve as a stop and gauge for a branch laid into the channel. The distance between each blade corner 42 and 44 and its respective wall 46 and 48 substantially corresponds with the distance between the cutting edge of the slitter 32 and the back wall of the socket 24, namely ¾ inch, in the illustrated embodiment.

The tool of FIGS. 6 through 9 is used to produce the grafting operations of FIGS. 1 through 5 in the following manner. First of all, the worker selects the components which are to be grafted to one another, first making certain that the components are of substantially corresponding diameter. Once the components are selected, the facing ends are prepared by making a smooth perpendicular cut. Next, taking one component at a time, the cut end of a component is placed in the socket 24 positioned in the bottom of the internal V-groove defined by the socket. The component is then pressed forward against the slitter 32 until the end comes up against the inner face of the window 28. This operation will produce a diametrical slit approximately ¾ inch lengthwise through the end of the component. The slit component is then withdrawn, rotated 90° and again placed in the socket and pushed in against the slitter to produce a second diametrical lengthwise slit oriented 90° with respect to the first slit and of the same depth. The transparent window 28 at this point is useful since it allows the worker to sight through the transparent window, which also serves as a stop and a gauge and allows him to verify the angular position of the work.

Once the second slit has been made, the component is withdrawn from the socket and placed in one of the channels 34 or 36. The component is placed in the channel so that the component end is butt against either wall 46 or 48 and aligned with the V-channel defined by the bottom of each channel. Using a rocking motion, the worker presses the component down against the blade 42 or 44 so as to sever and remove one sector 14 or 16. The worker then rotates the component 180° and repeats the step so as to remove the diametrically opposite sector 14 or 16.

The trimming, slitting and severing operations are then repeated for the other component of a plant so that both ends are sectored in the same manner. The component ends are then joined, as suggested in FIGS. 3 and 4, interlocked and sealed by tape, heat-shrinkable tubing, or the like. It will thus be appreciated that the blade 32 is so positioned with respect to the block that all cuts are made to the same dimension to insure uniformity in the sectoring of components to be joined.

Referring now to FIGS. 10 and 11, there is illustrated a modification of the invention, and in this embodiment there is shown an apparatus for producing the slitting and sectored cutting in a single operation. The apparatus includes a fixed support 50 having a flat, vertical front face 52, which serves as a stop and a gauge for a component applied against it. Extending forwardly from the support 50 are arms 54 and 56, each carrying a pair of slitting discs 58, 60, 62 and 64. The discs 58 through 62 are arrayed at right angles to one another with their cutting edges substantially contacting one another along a center line perpendicular to the face 52 as best shown in FIG. 11. The slitting discs are carried by bearings 64 mounted to the respective fingers 54 and 56 and freely rotatable. The point of contact of the slitting discs is located along the center line and spaced from the face 52 by a distance corresponding to the depth of the slit to be made in the component. In this fashion a component, once its end has been prepared by making a perpendicular cut, is fed along the center line and into the bite of the slitting disc toward the face 52 of the support 50. When the component is fed into the bite of the discs, four slits will be made automatically, lengthwise in the end of the component to a desired, repeatable depth, the component being pressed up against the face 52 to insure that all slits are made to the same depth.

In the illustrated embodiment of FIG. 10, a microswitch 56 is provided along the center line in the face 52 and at the end of the path of travel of the component being fed between the slitters. When the component contacts the switch 66 the switch will close, completing a circuit through a lead 68 to actuators 70 and 72, causing the trimming blades 74 and 76 to reciprocate toward one another in directions perpendicular to the length of the component and parallel to the face 52. The trimming blades are located diametrically opposite one another, as shown in FIG. 11, and in a plane passing through the point of contact for the slitting discs. The blades 74 and 76 are formed with right angular cutting tips which move in against the component cutting away the opposing slit sectors 14 and 16. The component is then withdrawn and the sectors 14 and 16 drop away. The operation is repeated for the other component and the parts are joined as before.

Referring now more particularly to FIG. 12, there is illustrated a hand-operated tool 78 embodying the features of the FIGS. 10 and 11 apparatus and comprised of a handle 80, on one end of which is mounted a cage 82 formed by an annulus 84 spaced from the flat face 86 on the forward end of the handle 80. The annulus is supported to the handle by means of frame members 88 and 90 which also carry four slitting discs 92, 94, 96 and 98 arrayed perpendicular to one another in the same manner as in FIGS. 10 and 11 embodiment and spaced from the face 86 in similar fashion. Trimming blades 100 and 102 are located in the same relative position with respect to the discs, as in the FIGS. 10 and 11 embodiment, but in this instance are carried by lever arms 104 and 106, the forward ends of which are pivoted by hinges 108 and 110 on the annulus 84. The lever arms extend rearwardly, generally parallel with the handle 80, with the rear ends thereof turned into the handle, the rear of which is hollow to accommodate a spring 112 serving to keep the lever handles 104 and 106 and their cutting blades 100 and 102 in the open or extended position.

The tool is used in the manner similar to the FIGS. 10 and 11 embodiment, with the component being fed axially into the bite of the slitting discs to butt against the face 86 of the handle. Once in this position, the lever arms 104 and 106 are squeezed, causing the blades 100 and 102 to cut into the component trimming away the slit sectors, and the component is then withdrawn.

In FIG. 13 there is illustrated a tool 20' similar to the tool 20 of FIGS. 6 through 9, with the exception that in place of a transparent window at the end of the socket 24', the face 30' is formed with an opening 28' smaller than the socket 24' and defining a shoulder stop 114 at the inner end of the socket.

While the invention has been described with particular reference to the illustrated embodiment, numerous modifications thereto appear to those skilled in the art.

Having thus described the invention, what I claim and desire to obtain by Letters Patent of the United States is:

1. A device for cutting away sectors from the facing ends of plant comonents to be grafted one to the other, comprising
   a. a body of rigid construction,
   b. said body being formed with a socket in one face thereof,
   c. a slitter mounted to said body and through said socket,
   d. the plane of said slitter disposed substantially along the longitudinal axis of said socket for making longitudinal slits at least twice the component diameter in components inserted therein,
   e. at least one channel formed along another face of said body in a direction perpendicular to the length of said socket and the plane of said slitter,
   f. one end of said slitter extending into said channel for severing sectors of slit components applied thereto.

2. A device, according to claim 1, wherein said body includes a transparent wall defining the base of said socket.

3. A device, according to claim 1, including a stop wall at one end of said channel spaced from said one end of said slitter.

4. A device, according to claim 3, wherein the distance between said one end of said slitter and said stop wall is substantially equal to the distance between the cutting edge of said slitter and the base of said socket.

5. A device, according to claim 3, wherein said socket is formed with a V-shaped groove along the bottom thereof.

6. A device, according to claim 1, wherein said body is formed with a reduced opening at the inner end of said socket and defining a shoulder stop at the end thereof.

7. A device for cutting away sectors from the facing ends of plant components, comprising
   a. a frame formed with a working face,
   b. a plurality of slitting discs mounted rotatably to said frame in spaced relation to said face and oriented at even angular positions about a common center line extending perpendicularly from said face with the periphery of each disc tangential to said center line, whereby a component fed along said center line and against said face will be slit longitudinally into equal sectors, and
   c. cutters mounted to said frame in spaced parallel relation to said face and between pairs of discs for movement to and away from said center line for severing opposing sectors from said component.

8. A device, according to claim 7, including power actuating means connected to said cutters and switch means mounted to said face and operatively connected to said actuating means, said switch being responsive to the end of a component engaging said face.

9. A device, according to claim 7, including lever means engaging said cutters for manually moving said cutters to and away from said center line.

10. The method of grafting one plant component to another of similar diameter comprising the steps of
 a. trimming the facing end of each component perpendicularly to the length thereof,
 b. removing from the facing end of each component two diametrically opposite matching wedge-shaped quadrants having end planes perpendicular to said each component length and being of substantially equal length and of a thickness equal to the radius of said components,
 c. coaxially aligning the facing sectored ends of said components with the ends oriented for sliding, interlocking engagement,
 d. sliding said ends together, and
 e. binding the joint formed thereby.

11. The method of claim 10 wherein the end of each component is diametrically and longitudinally slit along lines located at substantially 90° to one another to form four substantially equal sectors and then severing two diametrically opposed sectors at the inner ends of the slits.

* * * * *